US008864344B2

(12) United States Patent
Jiang et al.

(10) Patent No.: US 8,864,344 B2
(45) Date of Patent: Oct. 21, 2014

(54) POLYHEDRAL SECONDARY OPTICAL LENS

(75) Inventors: Jin Bo Jiang, Hong Kong (CN); Tin Po Chu, Hong Kong (CN); Wa Hing Leung, Hong Kong (CN)

(73) Assignee: Huizhou Light Engine Limited, Huizhou (CN)

( * ) Notice: Subject to any disclaimer, the term of this patent is extended or adjusted under 35 U.S.C. 154(b) by 338 days.

(21) Appl. No.: 13/523,497

(22) Filed: Jun. 14, 2012

(65) Prior Publication Data

US 2013/0223081 A1    Aug. 29, 2013

(30) Foreign Application Priority Data

Feb. 29, 2012  (CN) .......................... 2012 1 0050913

(51) Int. Cl.
*F21V 7/00*   (2006.01)
*F21V 5/00*   (2006.01)

(52) U.S. Cl.
USPC ............ 362/309; 362/336; 362/339; 362/348

(58) Field of Classification Search
USPC ....................................................... 362/309
See application file for complete search history.

(56) References Cited

U.S. PATENT DOCUMENTS

| 6,053,623 | A  | * | 4/2000 | Jones et al. .................. 362/310 |
| 6,273,596 | B1 | * | 8/2001 | Parkyn, Jr. .................... 362/522 |
| 7,530,701 | B2 | * | 5/2009 | Chan-Wing .................... 362/17 |
| 8,220,975 | B2 | * | 7/2012 | Miyashita et al. ............ 362/340 |
| 8,231,250 | B2 | * | 7/2012 | Bailey ............................ 362/328 |
| 8,419,229 | B2 | * | 4/2013 | Dong ........................ 362/311.02 |
| 8,419,232 | B2 | * | 4/2013 | Minano et al. ................ 362/328 |
| 2004/0114393 | A1 | * | 6/2004 | Galli ............................. 362/555 |

FOREIGN PATENT DOCUMENTS

| CN | 102042559 A    | 5/2011 |
| WO | WO-2009036001 A1 | 3/2009 |

OTHER PUBLICATIONS

Supplementary European Search Report dated Jul. 31, 2014 for European Patent Application No. 12869739.8.

* cited by examiner

*Primary Examiner* — David J Makiya
(74) *Attorney, Agent, or Firm* — Schiff Hardin LLP (57) ABSTRACT

The present invention relates to a secondary optical lens for a light emitting diode ("LED") light projector, comprising at least one lens unit, wherein the lens unit consists of a refraction portion in the centre and a total internal reflection portion on the outer ring; the central refraction portion has a convex surface on the bottom and is attached with a plurality of micro lenses; the bottom attached with a micro lens array; the total internal reflection portion on the outer ring of the lens unit comprises a cylindrical light incident surface with a slight draft angle, and a total internal reflection surface on the outer side, which adopts a diamondoid polyhedral flake design; and the top of the lens unit is a smooth plane surface used as the light emitting surface.

11 Claims, 11 Drawing Sheets

POLYHEDRAL SECONDARY OPTICAL LENS

CROSS-REFERENCE TO RELATED APPLICATIONS

This application is claims priority and benefit under 35 U.S.C. §119(a) to Chinese Patent Application No. 201210050913.5, filed Feb. 29, 2012, the entirety of which is incorporated herein by reference.

To the extent that publications are referenced within this application, disclosure of these references in their entirety is hereby incorporated by reference into this application.

BACKGROUND OF THE INVENTION

The present invention relates to an optical lens, particularly relates to a secondary optical lens of a polyhedron.

Most of the lenses for current light emitting diode (LED) light projectors are total internal reflection lenses, which are in the form of a single lens, three-in-one or all-in-one lens. The lens unit of such lens comprises a substantially smooth aspheric surface for light converging positioned in the centre, a smooth total internal reflection surface positioned on an outer side, and a light emitting surface on the top which is a smooth plane surface. For light projectors requiring a large light distribution angle or light mixing, the light emitting surfaces of certain lenses are designed as a micro lens array having a honeycomb shape. These total internal reflection lenses involve some disadvantages including:

1. A light spot projected by the smooth aspheric surface for light converging positioned in the centre of the lens unit has the square shadow of the LED chip due to imaging effect, which has very poor appearance;
2. Although a circular light spot may be projected by the smooth total internal reflection surface on the outer side of the lens unit, the light spot has sometimes inconsistent color temperature in the center and at the edge based on the chromatic dispersion effect of a prism as the lens is a total internal reflection lens with small lower dimension and large upper dimension; and
3. The total internal reflection lens with the honeycomb shaped micro lens array on the light emitting surface, although having a relatively even light mixing result, has relatively poor efficiency due to the Fresnel loss from the micro lens array on the light emitting surface.

In view of the above problems, the present invention provides a secondary optical lens, which has a plane light emitting surface, a central refraction portion having a plurality of micro lenses on the bottom surface. The present invention also provides a total internal reflection surface on the outer side adopting a diamondoid polyhedral flake design. This may ameliorate the problems of the projected square shadow from the LED chip as well as inconsistence of the color temperature in the centre and at the edge of the light spot.

BRIEF SUMMARY OF THE INVENTION

In order to resolve the aforementioned problems, the present invention provides a secondary optical lens for a LED light projector, comprising: at least one lens unit; a refraction portion at a central position of the at least one lens unit, the refraction portion having a convex surface on a bottom side and being attached with a plurality of micro lenses; a total internal reflection portion on an outer ring of the at least one lens unit, the total internal reflection portion comprising a cylindrical light incident surface with a slight draft angle; a total internal reflection surface on an outer side, the total internal reflection surface having a diamondoid polyhedral flake design; and a top surface having a smooth plane surface that is used as a light emitting surface.

Preferably, the plurality of micro lenses is a micro lens array to correct projected square shadow of an LED chip to a circular light spot besides functioning as light converging, and to cause light mixing.

Preferably, the diamondoid polyhedral flake of the outer total internal reflection surface of the total internal reflection portion cause light mixing to remove the color temperature difference in the centre and at the edge of the light spot.

Preferably, further comprising a plurality of slots or an assembly snap lugs at a bottom side of the at least one lens unit.

Preferably, the micro lens array causes light mixing in a local area, and a light beam is emitted with the optical axis OZ as the centre line at beam angles of $\pm\theta$, after output through the refraction portion of the at least one lens unit, wherein the angle $\theta$ lies in $5°{\sim}22.5°$.

Preferably, a single micro lens of the micro lens array has light mixing conditions including: the refracted light of OP that is refracted at the centre point P of the micro lens is collimatingly output along a direction parallel to the optical axis OZ, with the output light ray being QR; the edge light rays OP1 and OP2, after being refracted at the edge of the micro lens, are converged within the single micro lens, then refracted outward through the top surface, with the output light rays being Q1R1 and Q2R2 respectively, wherein Q1R1 and Q2R2 include a respective angle $\pm\theta$ with the central light ray QR.

Preferably, the total internal reflection surface has light distribution conditions including: the light ray incident on the distal bottom end A includes an angle of $-\theta/2$ with the optical axis OZ after being reflected by the total internal reflection surface and being output through the top surface; the light ray incident on the top most end B includes an angle of $\theta$ with the optical axis OZ after being reflected by the total internal reflection surface and being output through the top surface; and the light rays incident on other locations on the total internal reflection surface are distributed evenly in proportion such that they include an angle ranging from $-\theta/2$ to $\theta$ with the optical axis OZ; and wherein all of the light rays, after being reflected by the total internal reflection surface and output through the top surface include a distribution angle within the range of $\pm\theta$ with the optical axis OZ.

Preferably, a single diamondoid flake on the total internal reflection surface has light mixing conditions including: the output edge light rays T1U1 and T2U2 produce light diffusion at an angle of $\pm\Delta\theta$ with the central light ray TU as the central axis, wherein the angle $\pm\Delta\theta$ is the diffusing angle and lies in the range from $\pm3°$ to $\pm5°$.

Preferably, the lens can be any one from the following group which consists of at least one lens unit: a single lens, a two-in-one lens, a three-in-one lens, a four-in-one lens, a five-in-one lens, a seven-in-one lens, and a tens-in-one composite lens.

Preferably, a lower surface of a table for attaching a plurality of the at least one lens units is a non-optical surface on which micro structure process of frosting or decoration is performed.

Preferably, snap lugs are used to position and fix the lens to a printed circuit board under the table for attaching the plurality of the at least one lens units.

BRIEF DESCRIPTION OF THE DRAWINGS

An example of the invention will now be described with reference to the accompanying drawings, in which.

DETAILED DESCRIPTION OF THE INVENTION

Figure 1:
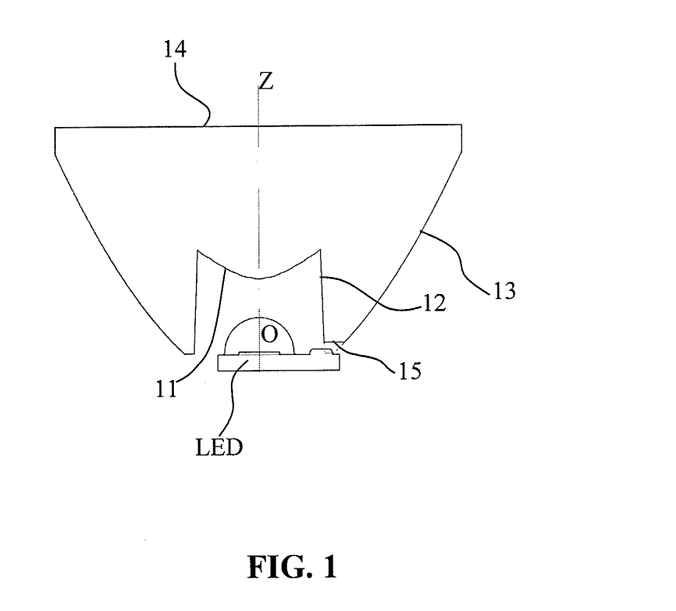
FIG. 1 is a sectional side view of the lens unit in accordance with an embodiment of the present invention.
Figure 2:
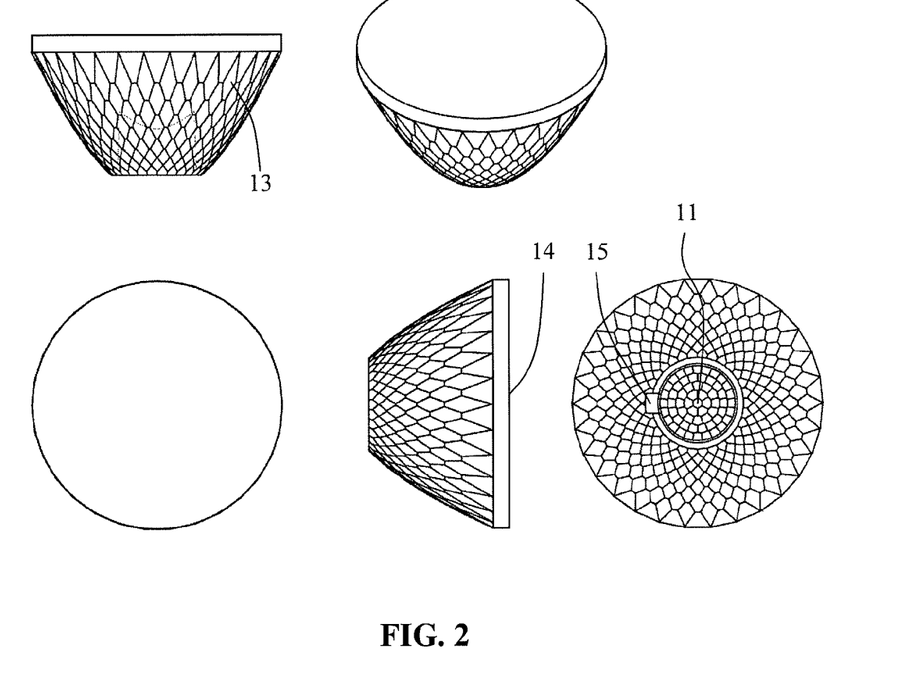
FIG. 2 is a series of three-dimensional perspective views of the lens unit.

A secondary optical lens for a LED light projector is provided. A sectional view of the lens unit is shown in FIG. 1, and several three-dimensional perspective views of the lens unit are shown in FIG. 2. The lens unit 5 consists of a refraction portion in the centre and a total internal reflection portion on the outer ring. The refraction portion has a convex surface 11 on the bottom that is attached with a micro lens array, which may correct the projected square shadow of the LED chip to a circular light spot besides functioning light converging, and meanwhile effects light mixing. The total internal reflection portion on the outer ring comprises a cylindrical light incident surface 12 with a slight draft angle, and a total internal reflection surface 13 on the outer side, which adopts a diamondoid polyhedral flake design and thereby effects light mixing so as to remove the color temperature difference in the centre and at the edge of the light spot. The top surface 14 of the lens unit 5 is a smooth plane surface used as the light emitting surface.

The bottom of the lens unit may be configured with some slots or an assembly of snap lugs in accordance with the appearance and structural features of the LED. For example, if the LED is a Luxeon A from Philips, which has a small protrusion on the base plate, then to avoid the small protrusion during assembly, a small slot 15 depicted in FIG. 1, may be made on the bottom of the lens. If the LED is a XPG from Cree, the slot 15 may be removed from the bottom of the lens due to absence of the small protrusion on the base plate.

Figure 3:
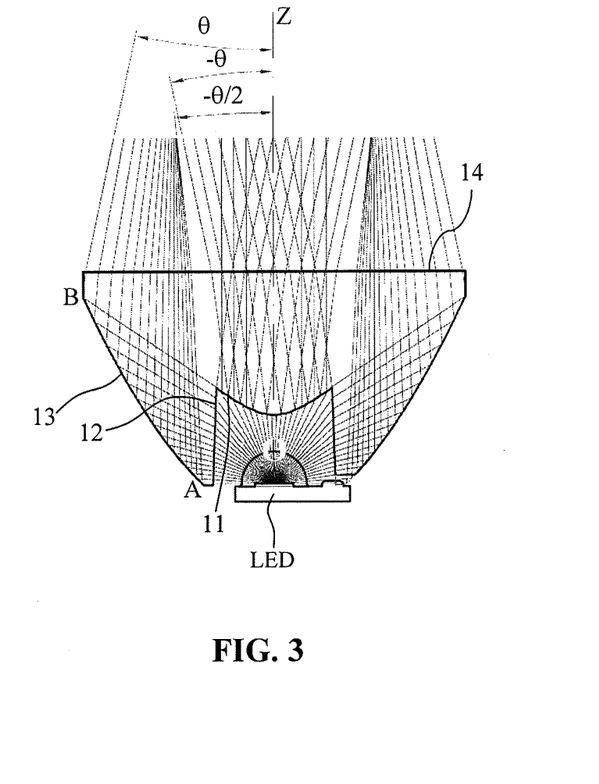
FIG. 3 is a sectional side view depicting the design principle of the lens unit.

The design principle of the lens unit is shown in FIG. 3. A portion of the light rays emitting from the centre θ of the light emitting surface of the LED chip that are close to the optical axis OZ are directly incident on the bottom surface 11 of the refraction portion in the centre of the lens unit over the LED, and then are output through the top surface 14 of the lens unit after light mixing through the micro lens array on the bottom surface 11. The bottom surface 11 is integrally a convex surface which effects light converging, and may also effect light mixing in a local area due to the plurality of micro lenses attached thereon. The light beam, after output through the refraction portion of the lens unit, is output with the optical axis OZ as the centre line at beam angles of ±θ.

The other portion of the light rays emitting from the centre θ of the light emitting surface of the LED chip include a relatively large angle with the optical axis OZ. The light rays are incident on the cylindrical surface 12 on the side. Then the light rays are incident on the total internal reflection surface 13 on the outer side of the lens unit after being refracted by the cylindrical surface 12. The total internal reflection surface 13 meets the following light distribution conditions:

1. The light ray incident on the bottom most end A includes an angle of −θ/2 with the optical axis OZ after being reflected by the total internal reflection surface 13 and being output by the plane surface 14;
2. The light ray incident on the top most end B includes an angle of θ with the optical axis OZ after being reflected by the total internal reflection surface 13 and being output by the plane surface 14; and
3. The light rays incident on other places on the total internal reflection surface 13, their output rays are distributed evenly in proportion in such a way that they include an angle ranging from −θ/2 to θ with the optical axis OZ.

This way, a circle of rays reflected by the total internal reflection surface 13 are distributed in the range of ±θ after being output through the plane surface 14.

The output light rays from the central refraction portion in the centre and the total internal reflection portion on the outer ring of the above described lens unit may produce a relatively even light spot distribution in the angle range of ±θ after superimposition. The angle θ lies in 5°~22.5°, preferably 10° in this embodiment, i.e. the full beam angle 2θ output from the lens unit is 20°.

Figure 4:
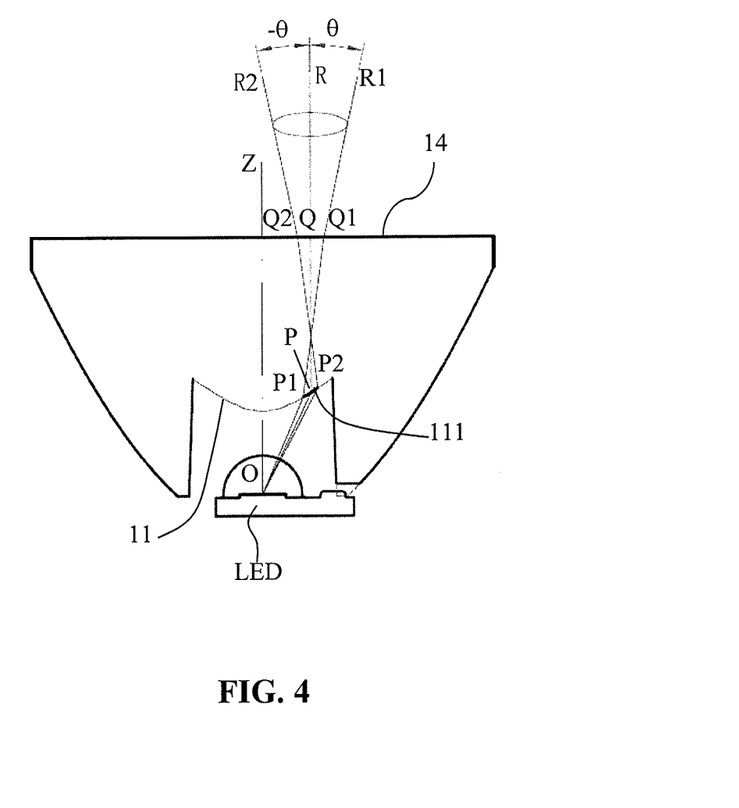
FIG. 4 is a sectional side view depicting the light mixing principle of a single micro lens on the bottom surface.

The light mixing principle for a single micro lens on the bottom surface of the central refraction portion of the lens unit is shown in FIG. 4. Here, OP indicates the light ray emitted from the centre O of the light emitting surface of the LED chip and incident on the centre of the single micro lens 111, OP1 indicates the light ray emitted from the centre O of the light emitting surface of the LED chip and incident on the left edge of the single micro lens 111, and OP2 indicates the light ray emitted from the centre O of the light emitting surface of the LED chip and incident on the right edge of the single micro lens 111. Since the micro lens 111 is attached onto the convex surface 11, the tangential surface in the centre is inclined, and its light mixing meets the following conditions: the refracted light of OP that is refracted at the centre P of the micro lens 111 is collimatingly output along a direction parallel to the optical axis OZ, with the output light ray being QR. The edge light rays OP1 and OP2, after being refracted by the left and right edges of the micro lens 111 respectively, are converged within the lens, then output through the emitting surface 14, with the output light rays being Q1R1 and Q2R2 respectively, wherein Q1R1 and Q2R2 include a respective angle ±θ with the central light ray QR.

Figure 5:
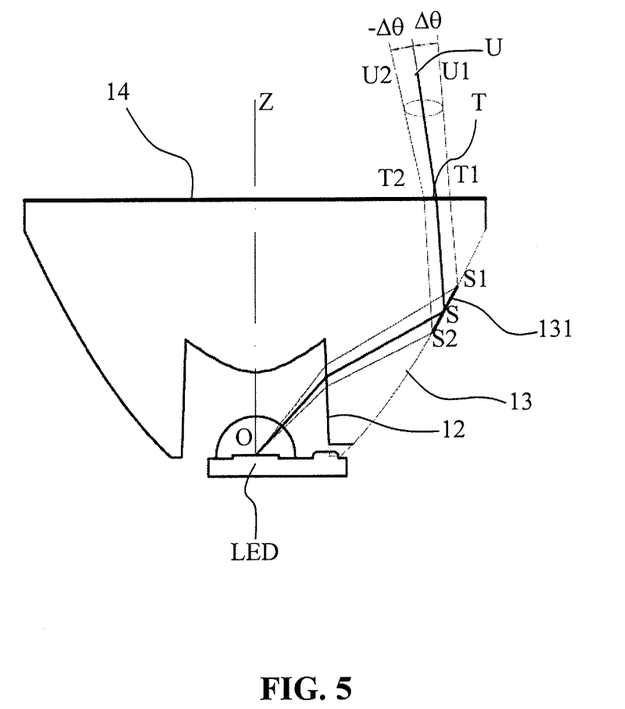
FIG. 5 is a sectional side view depicting the light mixing principle for the diamondoid flakes on the total internal reflection surface on the outer side.

The light mixing principle for the diamondoid flakes of the total internal reflection portion on the outer ring of the lens unit is shown in FIG. 5. In this figure, 131 is a diamondoid flake in the total internal reflection surface on the outer side, which is a facet, wherein the geometric centre is located at point S, point S1 and point S2 are located at the upper edge and the lower edge of the flake, respectively. The light emitted from the centre O of the light emitting surface of the LED chip, upon reflected at the central point S of the flake, is output as a light ray TU, wherein the angle between the light ray TU and the optical axis OZ effects light distribution in accordance with the design principle as shown in FIG. 3. The light emitted from the centre O of the light emitting surface of the LED chip, upon reflected at the upper edge point S1 of the flake, is output as a light ray T1U1. The light emitted from the centre O of the light emitting surface of the LED chip upon reflected at the lower edge point S2 of the flake, is output as a light ray T2U2. Since the diamondoid flake 131 is a facet, the edge light rays T1U1 and T2U2 output after reflection will produce light diffusion at an angle of ±Δθ with the central light ray TU as the central axis. The light diffusion in the angle of ±Δθ is a small angle diffusion, which lies in the angle ranging from ±3° to ±15° with respect to a lens of φ15 mm in diameter as the flake has a size between 0.5 mm and 1.5 mm. In this embodiment, the flakes positioned from the bottom to the top of the total internal reflection portion on the outer ring of the lens unit gradually change in size from about 0.6 mm to about 1.3 mm. This may produce light mixing at an angle ranging from ±4° to ±5° with the central light ray TU as the central axis, thereby producing a mild and comfortable light spot with even color temperature.

Figure 6:
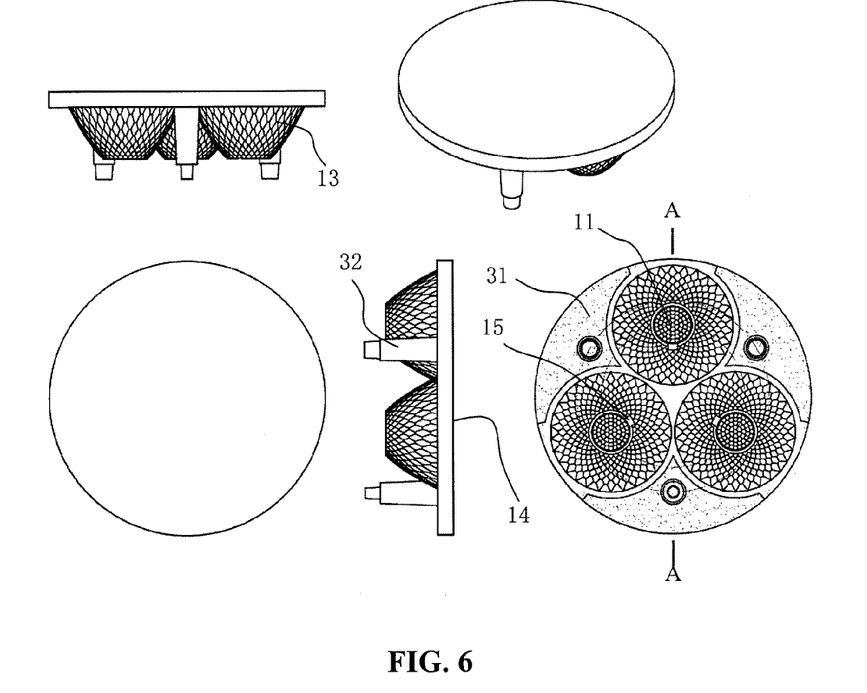
FIG. 6 is a series of three-dimensional perspective views of a three-in-one lens.
Figure 7:
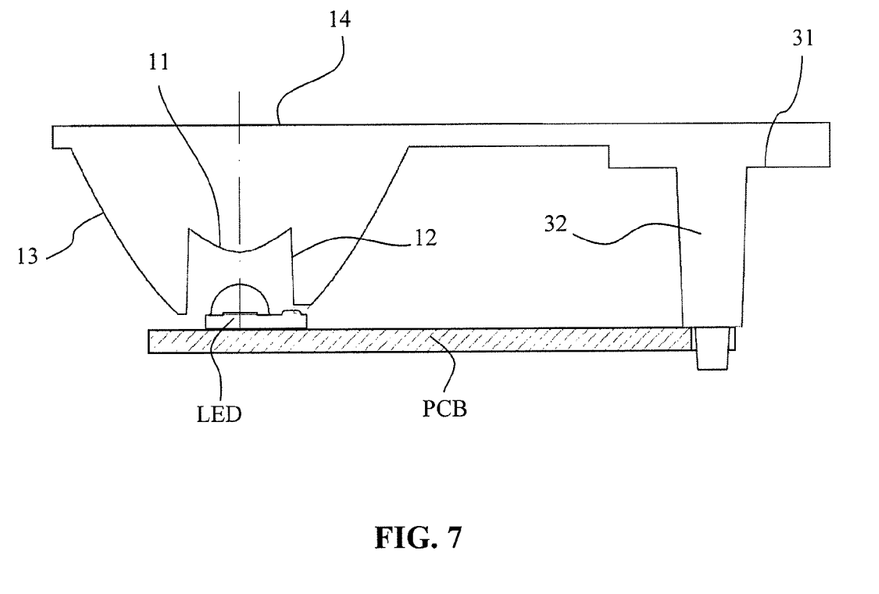
FIG. 7 is a section side view along the line A-A of the three-in-one lens.

As higher output luminous flux is required, a single LED sometimes cannot meet the requirement. In this case, a composite lens combined by several lens units is generally needed. Therefore it may be a two-in-one or three-in-one lens. In addition, it may also be a four-in-one, five-in-one, six-in-one, or seven-in-one lens, or even a lens combined by tens of lens units as used for an outdoor light projector. FIG. 6 shows the three-dimensional views of a three-in-one lens, and FIG. 7 shows a sectional view along the line A-A of the three-in-one lens. In FIGS. 6 and 7, 32 a snap lug for assembly is used to position and fix the lens to a printed circuit board (PCB). A lower surface 31 of a table for attaching the three lenses together, which is a non-optical surface where a micro structure process of frosting or decoration can be performed.

Figure 8:
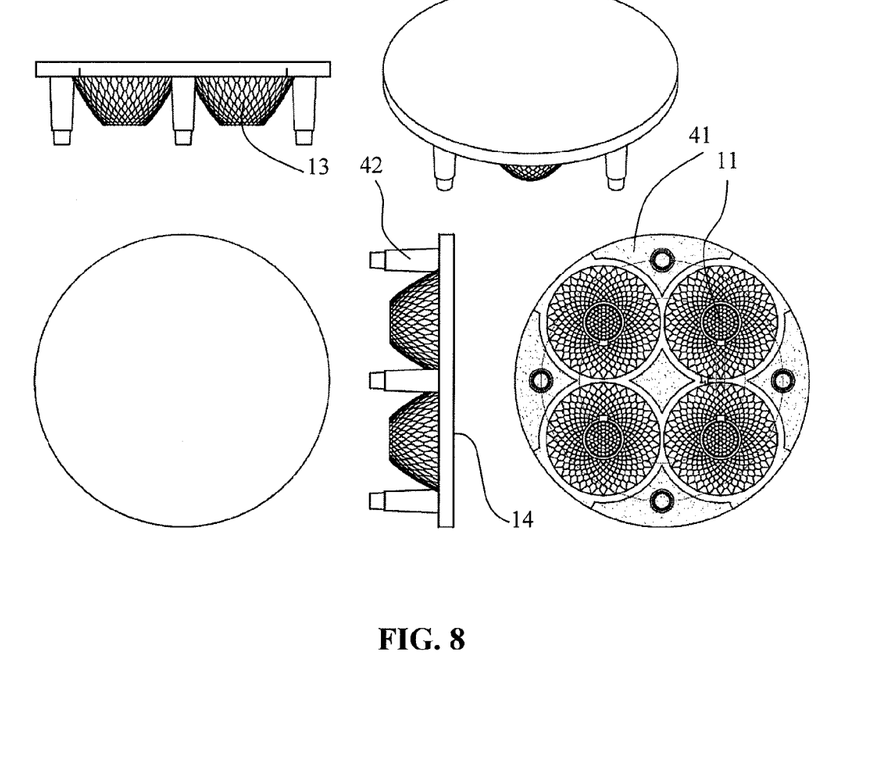
FIG. 8 is a series of three-dimensional perspective views of a four-in-one lens.

FIG. 8 shows the three-dimensional views of a four-in-one lens, which splices 4 lens units together. The lower surface 41 of the table for attaching the 4 lenses together is a non-optical surface on which micro structure process of frosting or decoration can be performed. A snap lug 42 for assembly is used to position and fix the lenses to the PCB.

An all-in-one lens shares the same light spot shape and light distribution curve profile with a single lens, except that the light intensity and illumination intensity is an integral multiple of the lens unit according to the number of the lenses.

Figure 9:
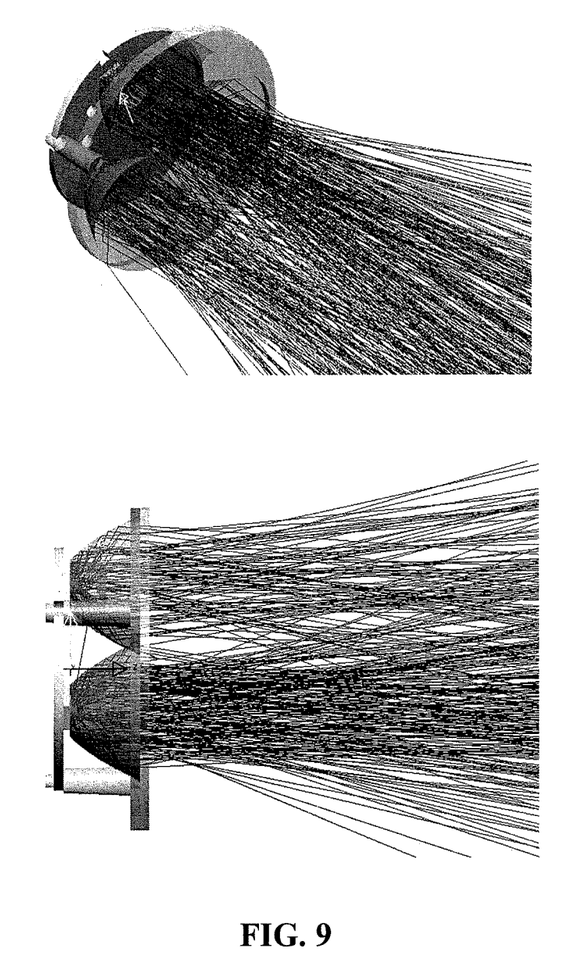
FIG. 9 is a ray trace diagram of the three-in-one lens.
Figure 10:
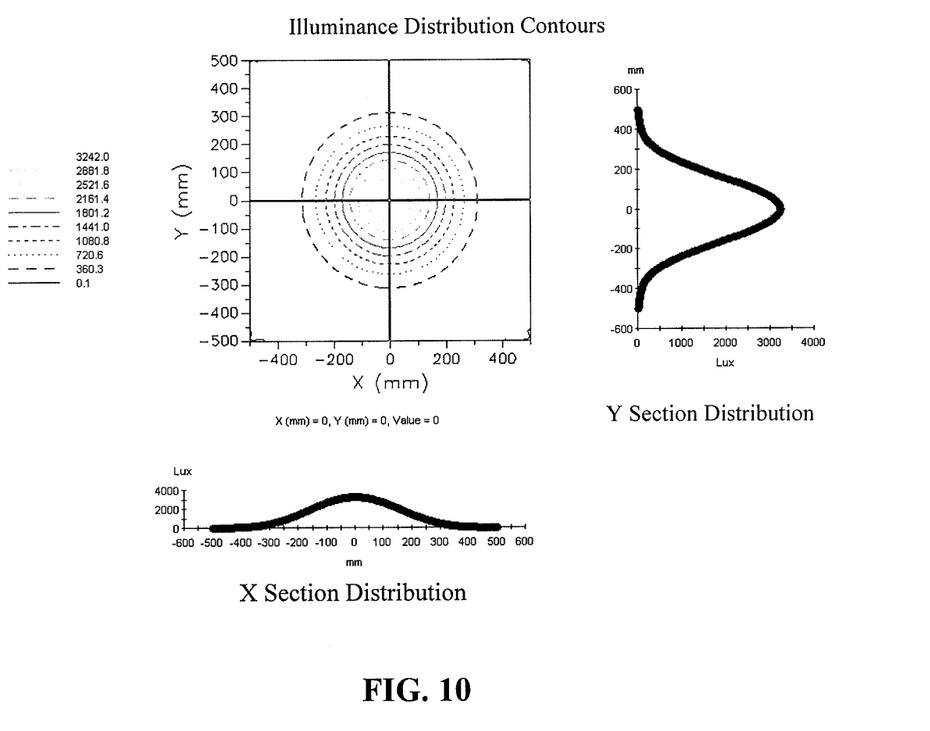
FIG. 10 is a illumination intensity contour distribution graph at the distance of 1 meter for the three-in-one lens.
Figure 11:
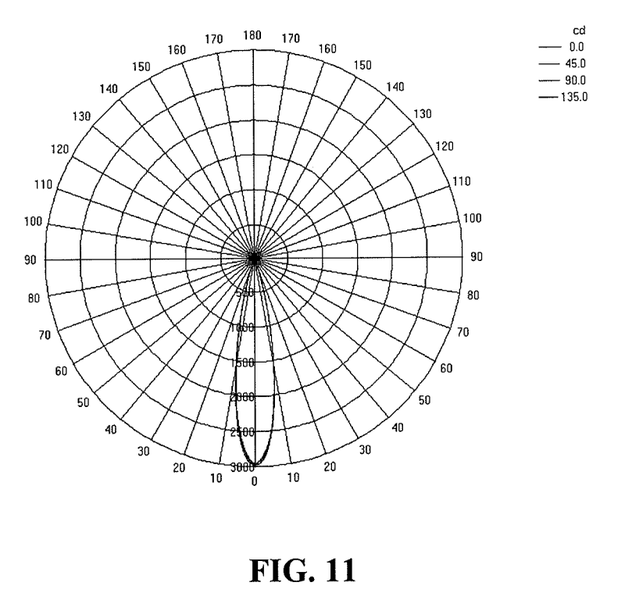
FIG. 11 is a far field angle distribution diagram of the light intensity for the three-in-one lens (light distribution curve).

FIG. 9 is the computer simulation and photometric analysis for a three-in-one lens. The LED is a Luxeon A from Philips, which has a luminous flux of 160 lumen for a single LED, and operating current of 700 mA. FIGS. 9 to 11 show the ray trace, illumination intensity distribution at the distance of 1 meter, and the light distribution curve, of a three-in-one lens, respectively. In theoretical computation, the candela to lumen ratio is 6.8625 cd/lm, the peak light intensity is 3036.6 cd, the peak illumination intensity at the distance of 1 meter is 3242.01 ux, and the optical efficiency of the lens is η=442.491m(screen)/4601 m(output)=96.19%, regardless of the loss of the material itself.

It will be appreciated by persons skilled in the art that numerous variations and/or modifications may be made to the invention as shown in the specific embodiments without departing from the scope or spirit of the invention as broadly described. The present embodiments are, therefore, to be considered in all respects illustrative and not restrictive.

What is claimed is:

1. A secondary optical lens for a LED light projector, comprising:
   at least one lens unit;
   a refraction portion at a central position of the at least one lens unit, the refraction portion having a convex surface on a bottom side and being attached with a plurality of micro lenses;
   a total internal reflection portion on an outer ring of the at least one lens unit, the total internal reflection portion comprising a cylindrical light incident surface with a slight draft angle;
   a total internal reflection surface on an outer side, the total internal reflection surface having a diamondoid polyhedral flake design; and
   a top surface having a smooth plane surface that is used as a light emitting surface.

2. The secondary optical lens according to claim 1, wherein the plurality of micro lenses is a micro lens array to correct a projected square shadow of an LED chip to a circular light spot besides functioning as light converging, and to cause light mixing.

3. The secondary optical lens according to claim 1, wherein the diamondoid polyhedral flake of the total internal reflection surface cause light mixing to remove the color temperature difference in the centre and at the edge of the light spot.

4. The secondary optical lens according to claim 1, further comprising a plurality of slots or an assembly snap lugs at a bottom side of the at least one lens unit.

5. The secondary optical lens according to claim 2, wherein the micro lens array causes light mixing in a local area, and a light beam is emitted with the optical axis OZ as the centre line at beam angles of ±θ, after output through the refraction portion of the at least one lens unit, wherein the angle θ lies in 5°~22.5°.

6. The secondary optical lens according to claim 2, wherein a single micro lens of the micro lens array has light mixing conditions including: the refracted light of OP that is refracted at the centre point P of the micro lens is collimatingly output along a direction parallel to the optical axis OZ, with the output light ray being QR; the edge light rays OP1 and OP2, after being refracted at the edge of the micro lens, are converged within the single micro lens, then refracted outward through the top surface, with the output light rays being Q1R1 and Q2R2 respectively, wherein Q1R1 and Q2R2 include a respective angle ±θ with the central light ray QR.

7. The secondary optical lens according to claim 3, wherein the total internal reflection surface has light distribution conditions including: the light ray incident on the distal bottom end A includes an angle of −θ/2 with the optical axis OZ after being reflected by the total internal reflection surface and being output through the top surface; the light ray incident on the top most end B includes an angle of θ with the optical axis OZ after being reflected by the total internal reflection surface and being output through the top surface; and the light rays incident on other locations on the total internal reflection surface are distributed evenly in proportion such that they include an angle ranging from −θ/2 to θ with the optical axis OZ; and
   wherein all of the light rays, after being reflected by the total internal reflection surface and output through the top surface include a distribution angle within the range of ±θ with the optical axis OZ.

8. The secondary optical lens according to claim 3, wherein a single diamondoid flake on the total internal reflection surface has light mixing conditions including: the output edge light rays T1U1 and T2U2 produce light diffusion at an angle of ±Δθ with the central light ray TU as the central axis, wherein the angle ±Δθ is the diffusing angle and lies in the range from ±3° to ±5°.

9. The secondary optical lens according to claim 1, wherein the lens can be any one from the following group which consists of at least one lens unit: a single lens, a two-in-one lens, a three-in-one lens, a four-in-one lens, a five-in-one lens, a seven-in-one lens, and a tens-in-one composite lens.

10. The secondary optical lens according to claim 1, wherein a lower surface of a table for attaching a plurality of the at least one lens units is a non-optical surface on which micro structure process of frosting or decoration is performed.

11. The secondary optical lens according to claim 10, wherein snap lugs are used to position and fix the lens to a printed circuit board under the table for attaching the plurality of the at least one lens units.

* * * * *